United States Patent
Hua et al.

(10) Patent No.: US 11,630,596 B1
(45) Date of Patent: Apr. 18, 2023

(54) SHARING SPARE CAPACITY OF DISKS WITH MULTIPLE SIZES TO PARALLELIZE RAID REBUILD

(71) Applicant: Dell Products L.P., Hopkinton, MA (US)

(72) Inventors: Kuolin Hua, Natick, MA (US); Kunxiu Gao, Boxborough, MA (US)

(73) Assignee: Dell Products L.P., Hopkinton, MA (US)

( * ) Notice: Subject to any disclaimer, the term of this patent is extended or adjusted under 35 U.S.C. 154(b) by 0 days.

(21) Appl. No.: 17/499,918

(22) Filed: Oct. 13, 2021

(51) Int. Cl.
  *G06F 3/00* (2006.01)
  *G06F 3/06* (2006.01)
  *G06F 11/10* (2006.01)
  *G06F 11/20* (2006.01)

(52) U.S. Cl.
  CPC .......... *G06F 3/0644* (2013.01); *G06F 3/0604* (2013.01); *G06F 3/0614* (2013.01); *G06F 3/0689* (2013.01); *G06F 11/1084* (2013.01); *G06F 11/1088* (2013.01); *G06F 11/1092* (2013.01); *G06F 11/2023* (2013.01); *G06F 2211/1023* (2013.01)

(58) Field of Classification Search
  CPC .... G06F 3/0644; G06F 3/0604; G06F 3/0614; G06F 3/0689; G06F 11/1084; G06F 11/1088; G06F 11/1092; G06F 11/2023; G06F 2211/1023
  See application file for complete search history.

(56) References Cited

U.S. PATENT DOCUMENTS

| | | | | |
|---|---|---|---|---|
| 11,144,396 | B1* | 10/2021 | Hua | G06F 11/2094 |
| 2002/0124137 | A1* | 9/2002 | Ulrich | G06F 3/064 |
| | | | | 714/E11.034 |
| 2013/0124776 | A1* | 5/2013 | Hallak | G06F 11/1008 |
| | | | | 711/E12.008 |
| 2021/0124506 | A1* | 4/2021 | Han | G06F 3/0608 |
| 2021/0365216 | A1* | 11/2021 | Martin | G06F 3/0631 |

* cited by examiner

*Primary Examiner* — Reginald G Bragdon
*Assistant Examiner* — Michael L Westbrook
(74) *Attorney, Agent, or Firm* — Anderson Gorecki LLP

(57) ABSTRACT

Managed drives of a storage node with different size drives in a fixed arithmetic relationship are organized into clusters of same size drives. Every drive is configured to have M*G same-size partitions, where M is a positive integer variable defined by the arithmetic relationship and G is the RAID group size. The storage capacity of all drives can be viewed as matrices of G+1 rows and M*G columns, and each matrix is composed of submatrices of G+1 rows and G columns. Diagonal spare partitions are allocated and distributed in the same pattern over groups of G columns of all matrices, for increasing partition index values. Members of RAID groups are vertically distributed such that the members of a given RAID group reside in a single partition index of a single cluster. When a drive fails, protection group members of the failed drive are rebuilt in order on spare partitions characterized by lowest partition indices for increasing drive numbers across multiple clusters. Consequently, drive access for rebuild is parallelized and latency is reduced.

17 Claims, 6 Drawing Sheets

Cluster 300 (Drives 105)

| disk/part | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| 1 | 1 | 2 | 3 | 4 | 5 | 6 | 7 | 8 | 9 | 10 | 11 | 12 | 13 | 14 | 15 | 16 |
| 2 | 1 | 2 | 3 |   | 5 | 6 | 7 |   | 9 | 10 | 11 |    | 13 | 14 | 15 |    |
| 3 | 1 | 2 |   | 4 | 5 | 6 |   | 8 | 9 | 10 |    | 12 | 13 | 14 |    | 16 |
| 4 | 1 |   | 3 | 4 | 5 |   | 7 | 8 | 9 |    | 11 | 12 | 13 |    | 15 | 16 |
| 5 |   | 2 | 3 | 4 |   | 6 | 7 | 8 |   | 10 | 11 | 12 |    | 14 | 15 | 16 |

Cluster 302 (Drives 102)

| disk/part | 1 | 2 | 3 | 4 | 5 | 6 | 7 | 8 |
|---|---|---|---|---|---|---|---|---|
| 6 | 17 | 18 | 19 | 20 | 21 | 22 | 23 | 24 |
| 7 | 17 | 18 | 19 |    | 21 | 22 | 23 |    |
| 8 | 17 | 18 |    | 20 | 21 | 22 |    | 24 |
| 9 | 17 |    | 19 | 20 | 21 |    | 23 | 24 |
| 10 |   | 18 | 19 | 20 |    | 22 | 23 | 24 |

Cluster 304 (Drives 101)

| disk/part | 1 | 2 | 3 | 4 |
|---|---|---|---|---|
| 11 | 25 | 26 | 27 | 28 |
| 12 | 25 | 26 | 27 |    |
| 13 | 25 | 26 |    | 28 |
| 14 | 25 |    | 27 | 28 |
| 15 |    | 26 | 27 | 28 |

Cluster 306 (Drives 101)

| disk/part | 1 | 2 | 3 | 4 |
|---|---|---|---|---|
| 16 | 29 | 30 | 31 | 32 |
| 17 | 29 | 30 | 31 |    |
| 18 | 29 | 30 |    | 32 |
| 19 | 29 |    | 31 | 32 |
| 20 |    | 30 | 31 | 32 |

| | disk/part | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|---|
| Cluster 300 (Drives 105) | 1 | 1 | 2 | 3 | 4 | 5 | 6 | 7 | 8 | 9 | 10 | 11 | 12 | 13 | 14 | 15 | 16 |
| | 2 | 1 | 2 | 3 | 4 | 5 | 6 | 7 |   | 9 | 10 | 11 |   | 13 | 14 | 15 |   |
| | 3 | 1 | 2 | 3 | 4 | 5 | 6 |   | 8 | 9 | 10 |   | 12 | 13 | 14 |   | 16 |
| | 4 | 1 | 2 | 3 | 4 | 5 |   | 7 | 8 | 9 |   | 11 | 12 | 13 |   | 15 | 16 |
| | 5 | 1 | 2 | 3 | 4 |   | 6 | 7 | 8 |   | 10 | 11 | 12 |   | 14 | 15 | 16 |
| Cluster 302 (Drives 102) | 6 | 17 | 18 | 19 | 20 | 21 | 22 | 23 | 24 | | | | | | | | |
| | 7 | 17 | 18 | 19 | 8 | 21 | 22 | 23 |   | | | | | | | | |
| | 8 | 17 | 18 | 7 | 20 | 21 | 22 |   | 24 | | | | | | | | |
| | 9 | 17 | 6 | 19 | 20 | 21 |   | 23 | 24 | | | | | | | | |
| | 10 | 5 | 18 | 19 | 20 |   | 22 | 23 | 24 | | | | | | | | |
| Cluster 304 (Drives 101) | 11 | 25 | 26 | 27 | 28 | | | | | | | | | | | | |
| | 12 | 25 | 26 | 27 | 12 | | | | | | | | | | | | |
| | 13 | 25 | 26 | 11 | 28 | | | | | | | | | | | | |
| | 14 | 25 | 10 | 27 | 28 | | | | | | | | | | | | |
| | 15 | 9 | 26 | 27 | 28 | | | | | | | | | | | | |
| Cluster 306 (Drives 101) | 16 | 29 | 30 | 31 | 32 | | | | | | | | | | | | |
| | 17 | 29 | 30 | 31 | 16 | | | | | | | | | | | | |
| | 18 | 29 | 30 | 15 | 32 | | | | | | | | | | | | |
| | 19 | 29 | 14 | 31 | 32 | | | | | | | | | | | | |
| | 20 | 13 | 30 | 31 | 32 | | | | | | | | | | | | |

U.S. 11,630,596 B1

SHARING SPARE CAPACITY OF DISKS WITH MULTIPLE SIZES TO PARALLELIZE RAID REBUILD

TECHNICAL FIELD

The subject matter of this disclosure is generally related to electronic data storage, and more particularly to the use of spare storage capacity for rebuilding members of Redundant Array of Independent Disks (RAID) protection groups.

BACKGROUND

The disk drives in a typical mass data storage system are configured as members of RAID protection groups. A RAID protection group helps to avoid data loss by enabling a failed protection group member to be rebuilt using the remaining non-failed members. A RAID (D+P) protection group has D data members and P parity members. The data members store data. The parity members store non-data parity information such as XORs of the data values on the data members. In the event that a data member fails, the parity information is used with the non-failed data members to reconstruct the failed data member. A failed parity member can be reconstructed from the data members. A variety of different RAID levels with different numbers, types, and configurations of members are known, some of which can recover from simultaneous failure of multiple members. A typical data storage system includes multiple RAID protection groups of the same level, with same-size individual disks serving as protection group members. However, the size of disk drives that are added to a storage system tends to increase over time due to advances in technology, so a single storage node may have multiple disk drive sizes.

SUMMARY

In accordance with some aspects, an apparatus comprises a storage array comprising: at least one compute node comprising at least one processor and non-transitory computer-readable memory; a plurality of non-volatile drives of different sizes in a fixed arithmetic relationship relative to a baseline drive size; and a drive manager configured to: create M*G same-size partitions on the drives, where M is a positive integer defined by the fixed arithmetic relationship and baseline drive size, and G is a redundant array of independent disks (RAID) group size such that storage capacity of all drives defines matrices of G+1 rows and M*G columns, and each matrix comprises submatrices of G+1 rows and G columns; allocate single diagonal spare partitions over groups of G columns of all clusters; and vertically distribute members of RAID groups such that members of a given RAID group reside in a single partition index of a single cluster.

In accordance with some aspects, a method is implemented by a storage array comprising at least one compute node comprising at least one processor and non-transitory computer-readable memory, and a plurality of non-volatile drives of different sizes in a fixed arithmetic relationship relative to a baseline drive size, the method comprising: creating M*G same-size partitions on the drives, where M is a positive integer defined by the fixed arithmetic relationship and baseline drive size, and G is a redundant array of independent disks (RAID) group size such that storage capacity of all drives defines matrices of G+1 rows and M*G columns, and each matrix comprises submatrices of G+1 rows and G columns; allocating single diagonal spare partitions over groups of G columns of all clusters; and vertically distributing members of RAID groups such that members of a given RAID group reside in a single partition index of a single cluster.

In accordance with some aspects, a non-transitory computer-readable storage medium stores instructions that when executed by a storage array comprising at least one compute node comprising at least one processor and non-transitory computer-readable memory, and a plurality of non-volatile drives of different sizes in a fixed arithmetic relationship relative to a baseline drive size, cause the storage array to create distributed spare capacity, the method comprising: creating M*G same-size partitions on the drives, where M is a positive integer defined by the fixed arithmetic relationship and baseline drive size, and G is a redundant array of independent disks (RAID) group size such that storage capacity of all drives defines matrices of G+1 rows and M*G columns, and each matrix comprises submatrices of G+1 rows and G columns; allocating single diagonal spare partitions over groups of G columns of all clusters; and vertically distributing members of RAID groups such that members of a given RAID group reside in a single partition index of a single cluster.

All examples, aspects, implementations, and features mentioned in this disclosure can be combined in any technically possible way. Other aspects, features, and implementations may become apparent in view of the detailed description and figures.

BRIEF DESCRIPTION OF THE FIGURES

FIG. 3 illustrates parallel distribution of spare partitions in matrices that represent clusters of drives of different sizes.

FIG. 4 illustrates selection of parallel spare partitions for rebuild in the matrices of FIG. 3.

DETAILED DESCRIPTION

The terminology used in this disclosure is intended to be interpreted broadly within the limits of subject matter eligibility. The terms "disk," "drive," and "disk drive" are used interchangeably to refer to non-volatile storage media and are not intended to refer to any specific type of non-volatile storage media. The terms "logical" and "virtual" are used to refer to features that are abstractions of other features, e.g., and without limitation abstractions of tangible features. The term "physical" is used to refer to tangible features that possibly include, but are not limited to, electronic hardware. For example, multiple virtual computers could operate simultaneously on one physical computer. The term "logic" is used to refer to special purpose physical circuit elements, firmware, software, computer instructions that are stored on a non-transitory computer-readable medium and implemented by multi-purpose tangible processors, and any combinations thereof. Aspects of the inventive concepts are described as being implemented in a data storage system that includes host servers and a storage array. Such implementations should not be viewed as limiting. Those of ordinary skill in the art will recognize that there are a wide variety of implementations of the inventive concepts in view of the teachings of the present disclosure.

Some aspects, features, and implementations described herein may include machines such as computers, electronic components, optical components, and processes such as computer-implemented procedures and steps. It will be apparent to those of ordinary skill in the art that the computer-implemented procedures and steps may be stored as computer-executable instructions on a non-transitory computer-readable medium. Furthermore, it will be understood by those of ordinary skill in the art that the computer-executable instructions may be executed on a variety of tangible processor devices, i.e., physical hardware. For practical reasons, not every step, device, and component that may be part of a computer or data storage system is described herein. Those of ordinary skill in the art will recognize such steps, devices, and components in view of the teachings of the present disclosure and the knowledge generally available to those of ordinary skill in the art. The corresponding machines and processes are therefore enabled and within the scope of the disclosure.

Figure 1:
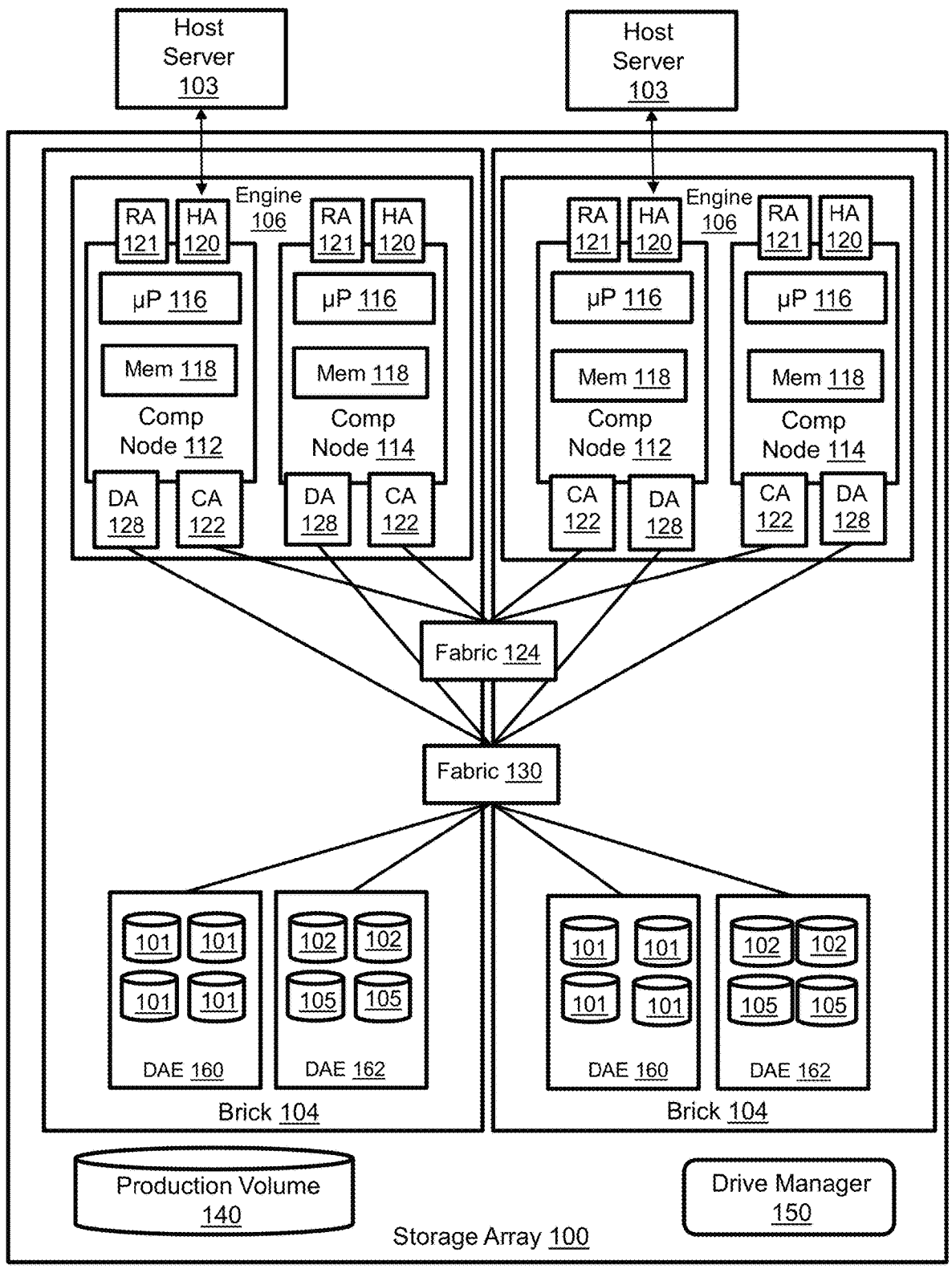
FIG. 1 illustrates a storage array with a drive manager that distributes spare capacity in parallel across drives of multiple sizes and selectively uses parallel spare capacity for rebuild of a failed member.

FIG. 1 illustrates a storage array 100 with a drive manager 150 that distributes spare capacity in parallel across drives of multiple sizes and selectively uses parallel spare capacity for rebuilding a failed member. The storage array is one example of a storage area network (SAN), which is one example of a data storage system in which the drive manager could be implemented. The storage array 100 is depicted in a simplified data center environment supporting two host servers 103 that run host applications, but the storage array would typically support more than two host servers. The host servers 103 include volatile memory, non-volatile storage, and one or more tangible processors. The storage array 100 includes one or more bricks 104. Each brick includes an engine 106 and one or more disk array enclosures (DAEs) 160, 162. Each engine 106 includes a pair of interconnected compute nodes 112, 114 that are arranged in a failover relationship and may be referred to as "storage directors." Although it is known in the art to refer to the compute nodes of a SAN as "hosts," that naming convention is avoided in this disclosure to help distinguish the network server hosts 103 from the compute nodes 112, 114. Nevertheless, the host applications could run on the compute nodes, e.g., on virtual machines or in containers. Each compute node includes resources such as at least one multi-core processor 116 and local memory 118. The processor may include central processing units (CPUs), graphics processing units (GPUs), or both. The local memory 118 may include volatile media such as dynamic random-access memory (DRAM), non-volatile memory (NVM) such as storage class memory (SCM), or both. Each compute node includes one or more host adapters (HAs) 120 for communicating with the host servers 103. Each host adapter has resources for servicing input-output commands (IOs) from the host servers. The host adapter resources may include processors, volatile memory, and ports via which the hosts may access the storage array. Each compute node also includes a remote adapter (RA) 121 for communicating with other storage systems, e.g., for remote mirroring, backup, and replication. Each compute node also includes one or more disk adapters (DAs) 128 for communicating with managed drives 101, 102, 105 in the DAEs 160, 162. Each disk adapter has processors, volatile memory, and ports via which the compute node may access the DAEs for servicing IOs. Each compute node may also include one or more channel adapters (CAs) 122 for communicating with other compute nodes via an interconnecting fabric 124. The managed drives 101, 102, 105 include non-volatile storage media that may be of a single technology type but having different sizes in terms of storage capacity, where technology types may include, without limitation, solid-state drives (SSDs) based on EEPROM technology such as NAND and NOR flash memory and hard disk drives (HDDs) with spinning disk magnetic storage media. Disk controllers may be associated with the managed drives as is known in the art. An interconnecting fabric 130 enables implementation of an N-way active-active backend. A backend connection group includes all disk adapters that can access the same drive or drives. In some implementations every disk adapter 128 in the storage array can reach every DAE via the fabric 130. Further, in some implementations every disk adapter in the storage array can access every managed disk.

Data associated with instances of the hosted applications running on the host servers 103 is maintained on the managed drives 101, 102, 105. The managed drives are not discoverable by the host servers, but the storage array creates a logical storage object known as a production volume 140 that can be discovered and accessed by the host servers. Without limitation, the storage object may be referred to as a source device, production device, or production LUN, where the logical unit number (LUN) is a number used to identify logical storage volumes in accordance with the small computer system interface (SCSI) protocol. From the perspective of the host servers 103, the production volume 140 is a single disk having a set of contiguous fixed-size logical block addresses (LBAs) on which data used by the instances of the host application resides. However, the host application data is stored at non-contiguous addresses on various managed drives 101, 102, 105. The compute nodes maintain metadata that maps between the logical block addresses of the production volume 140 and physical addresses on the managed drives 101, 102, 105 in order to process IOs from the hosts.

Figure 2:
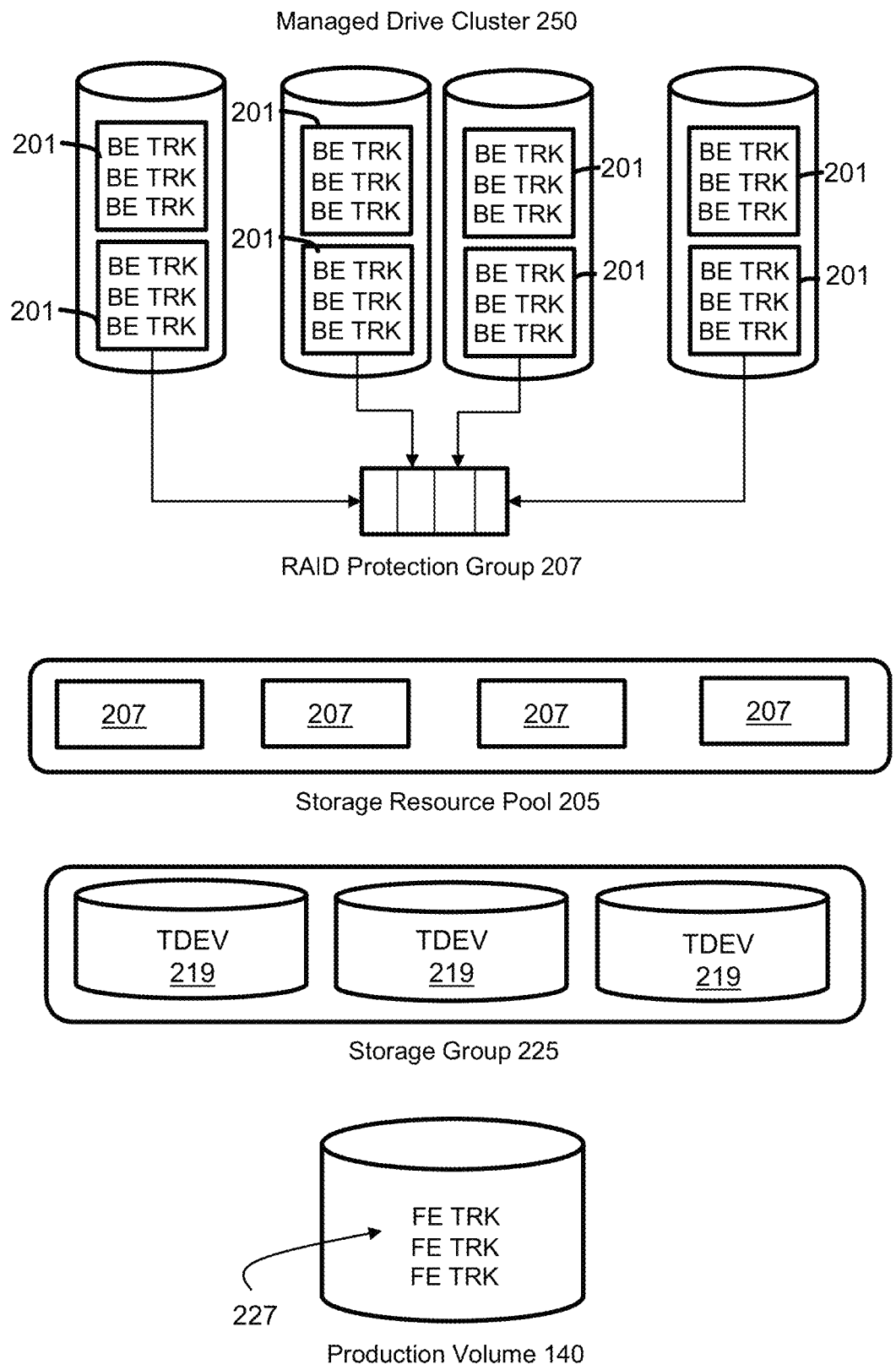
FIG. 2 illustrates layers of abstraction between the managed drives and the production volume of the storage array of FIG. 1.

FIG. 2 illustrates layers of abstraction between clusters of the managed drives and the production volume 140 in greater detail. Referring to FIGS. 1 and 2, the basic allocation unit of storage capacity that is used by the compute nodes 112, 114 to access the managed drives 101, 102, 105 is a back-end track (BE TRK). In some implementations the compute nodes do not access the managed drives using allocation units other than BE TRKs. BE TRKs may all have the same fixed size which may be an integer (greater than 1) multiple of the managed disk sector size. The respectively numbered managed drives 101, 102, 105 have different storage capacities characterized by a fixed arithmetic relationship, e.g., integer multiples or powers of 2 relative to a baseline size. For example, managed drives 101 may be the baseline size and managed drives 102, 105 may be two times and four times the storage capacity of the baseline size, respectively. All of the managed drives are organized into same size partitions 201, i.e., every partition has the same fixed size in terms of storage capacity. Moreover, the entire disk space may be partitioned. Each partition 201 may include multiple BE TRKs. Selection of partition storage capacity is a design implementation and, for context and without limitation, may be some fraction or percentage of the capacity of a managed disk equal to an integer multiple of the sector size. Each partition may include a contiguous range of logical addresses. A group of partitions from different managed drives of the same size within a managed drive cluster 250 is used to create a RAID protection group 207. The partitions accommodate protection group members. Each partition in a protection group must be on a different managed drive in order to be RAID compliant. All of the managed drives associated with a cluster and RAID protection group have the same storage capacity. A storage resource pool 205 is a collection of RAID protection groups 207 of the same type, e.g., RAID-5 (3+1). Logical thin devices (TDEVs) 219 are created from a storage resource pool and organized into a storage group 225. The production volume 140 is created from one or more storage groups. Host application data is stored in front-end tracks (FE TRKs) 227, that may be referred to as blocks, on the production volume 140. The FE TRKs 227 on the production volume 140 are mapped to BE TRKs 200 of the managed drives by metadata. The storage array may create and maintain multiple production volumes.

FIG. 3 illustrates parallel distribution of spare partitions using matrices that represent clusters 300, 302, 304, 306 of drives 101, 102, 105 of different sizes. Disk drives are represented by rows in the matrices. Partition indices are represented by columns in the matrices. Each cluster includes only same-size drives, and all clusters have the same number of drives. Every drive is configured to have M*G same-size partitions, where M is a positive integer variable defined for a drive size by the arithmetic relationship and G is the RAID group size. The storage capacity of all drives with the same size can be viewed as matrices of G+1 rows and M*G columns, where all drives with the same size have the same M value and each matrix is composed of submatrices of G+1 rows and G columns. Diagonal spare partitions are allocated and distributed in the same pattern over groups of G columns of all matrices, for increasing partition index values. Members of RAID groups are vertically distributed such that the members of a given RAID group reside in a single partition index of a single cluster. In the illustrated example, drives 11-20 form two clusters: a first cluster 304 of drives 11-15 and a second cluster 306 of drives 16-20, both of only baseline size managed drives 101. The baseline size drives have the smallest storage capacity (size) of all the managed drives. Drives 6-10 form a cluster 302 of 2× baseline size managed drives 102. Drives 1-5 form a cluster 300 of 4× baseline size managed drives 105. In the RAID-5 (3+1) implementation as shown, the RAID group size G=4. M=1 for the baseline size managed drives 101, so there are four partitions in the baseline clusters 304, 306. M=2 for the 2× baseline size managed drives 102, so there are eight partitions in cluster 302. M=4 for the 4× baseline size managed drives 105, so there are sixteen partitions in cluster 300.

The matrices that represent the clusters 304, 306 of baseline drives define a submatrix size into which the larger, MX baseline drive size clusters 300, 302 are divided. Each baseline matrix and MX baseline submatrix has G+1 rows and G columns. In the illustrated example, the baseline drive clusters have four partitions (columns) because G=4, and five drives (rows) because G+1=5. Consequently, the 2× baseline cluster 302 of drives 6-10 includes two submatrices: one submatrix of columns/partitions 1-4 and another submatrix of partitions 5-8. Similarly, the 4× baseline cluster 300 of drives 1-5 includes four submatrices of columns/ partitions 1-4, 5-8, 9-12, and 13-16. Members of RAID groups (numbered 1-32) are vertically distributed in partitions such that the members of a given RAID group reside in a single partition index of a single cluster. Spare partitions (shown as gray) are distributed in the same diagonal pattern within each baseline cluster matrix and MX baseline submatrix. For example, spares partitions can be created algorithmically at drive X, partition Y, where (X−1) modulo (G+1)+(Y−1) modulo (G)=G. The remaining G partitions per column are allocated for one RAID group. As a result, there are sufficient spares within each cluster for RAID rebuild if one drive in the cluster fails. However, as will be explained below, usage of spares is parallelized across clusters of different size drives so that rebuild is more efficient and latency is reduced.

FIG. 4 illustrates selection of parallel spare partitions for rebuild using the matrices of FIG. 3. In the illustrated example, 4× baseline size drive 1 fails. RAID members 1-16 of the failed drive are rebuilt on four sets of parallel, diagonal distributed spare partitions in the first four columns/partitions (1-4) of all matrices. This may be accomplished, for example, by selecting spare partitions having the lowest partition index for incremental drive indices such that drive 5, partition 1 is the first selected spare, followed by drive 10, partition 1, followed by drive 15, partition 1, followed by drive 20, partition 1, followed by drive 4, partition 2, followed by drive 9, partition 2, and so forth until the required number of spare partitions has been selected. The protection group members 1-16 of the failed drive may be rebuilt in the selected spare partitions in diagonal/cluster size order from lowest partition index to highest partition index. The result is that 16 drives are used in the rebuild. In contrast, only four drives would be used if the spare partitions of only cluster 300 were used. Accessing more drives in parallel is generally faster than accessing fewer drives because of individual drive IO limitations. Since the selected and utilized spare partitions are distributed across a maximum possible number of drives, RAID rebuild is highly parallelized and rebuild latency attributable to disk access latency is reduced or minimized relative to previous techniques. Once the failed drive is replaced, the rebuilt RAID members are copied from the spare partitions back to the original partition indices on the replacement drive, and the spare partitions are restored for use as spares.

Figure 5:
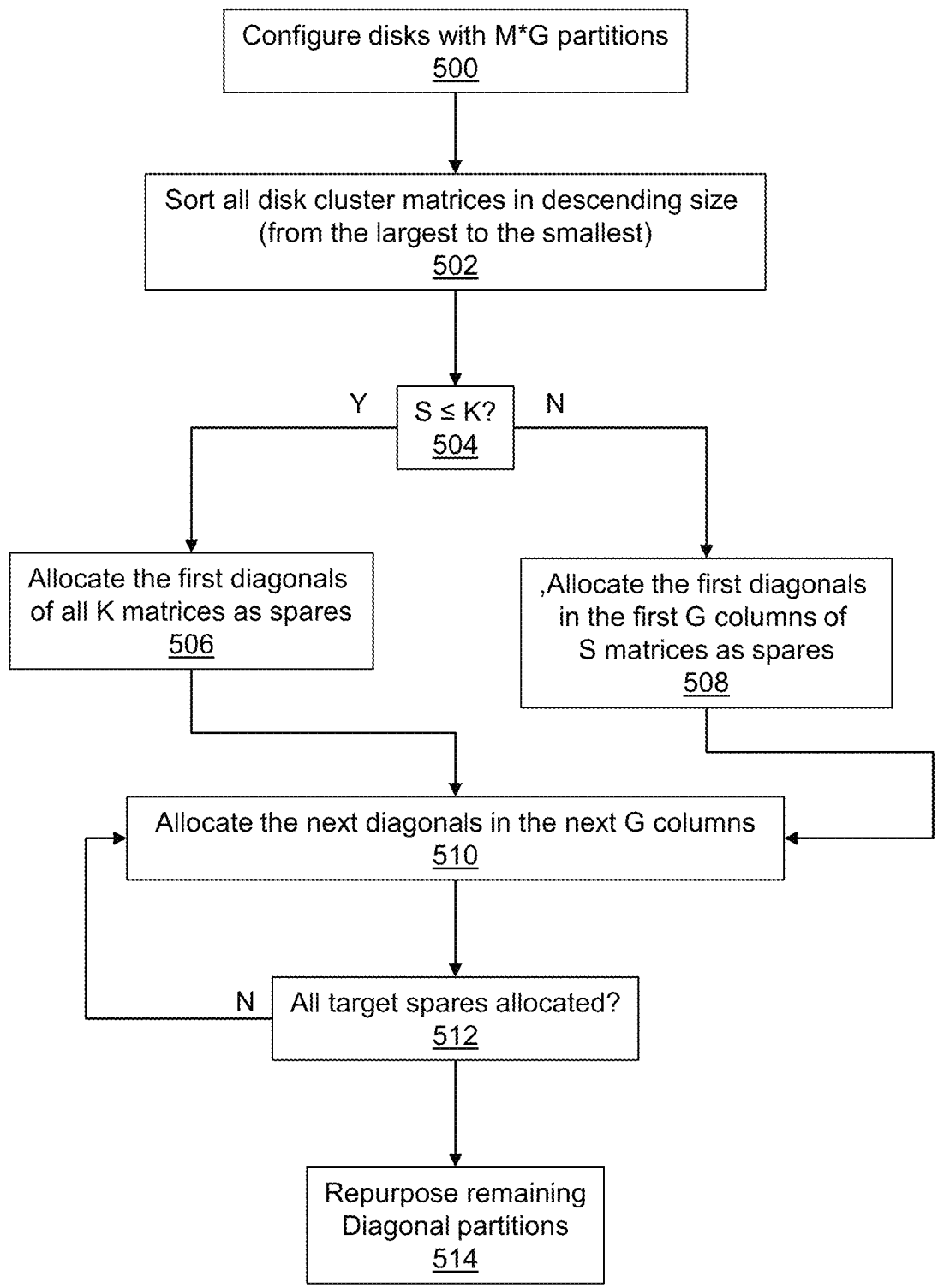
FIG. 5 illustrates a method for parallel distribution of spare partitions on drives of different sizes.

FIG. 5 illustrates a method for parallel distribution of spare partitions on drives of different sizes. The method allocates and distributes diagonally-oriented spare partitions over groups of G columns of all matrices, for increasing partition index values. The RAID group size G is the total number of data and parity members, and all drives are of the same type but with multiple sizes in a fixed arithmetic relationship such as integer multiples or power of 2. Each drive is configured with M*G partitions as indicated in step 500, where M is a variable integer defined by the baseline drive size and the fixed arithmetic relationship. The storage capacity of all drives can be viewed as matrices of G+1 rows and M*G columns, and each matrix is composed of submatrices of G+1 rows and G columns. All matrices are sorted in descending size (from the largest to the smallest) as indicated in step 502. Assuming the largest drive size is (Ma*G) partitions, K is the total number of matrices, and target spare capacity is (S*G) partitions, or S diagonals, spare partitions may be created to support recovery from a failure of the largest drive, i.e., S≥Ma. If S≤K as determined in step 504, then the first diagonals (in the first G columns) of S matrices are allocated as spares as indicated in step 506. The spares are then considered to be fully distributed for RAID rebuild. Otherwise, if S>K as determined in step 504, the first diagonals of all K matrices are allocated as spares as indicated in step 508. The target spare capacity remaining to be allocated is reduced by K diagonals. The next diagonals (in the next G columns) are allocated as indicated in step 510. For L equal to the number of next diagonals, L≤K, since the smaller matrices may not have the next G columns.

The remaining target spare capacity is reduced by L diagonals. The process is iterated for the next diagonals, until all target spare capacity has been allocated as determined in step 512. If the target spare capacity has been allocated, then the remaining diagonal partitions may be repurposed for RAID group members as indicated in step 514. Each diagonal of G partitions will fit one RAID group of G members.

Figure 6:
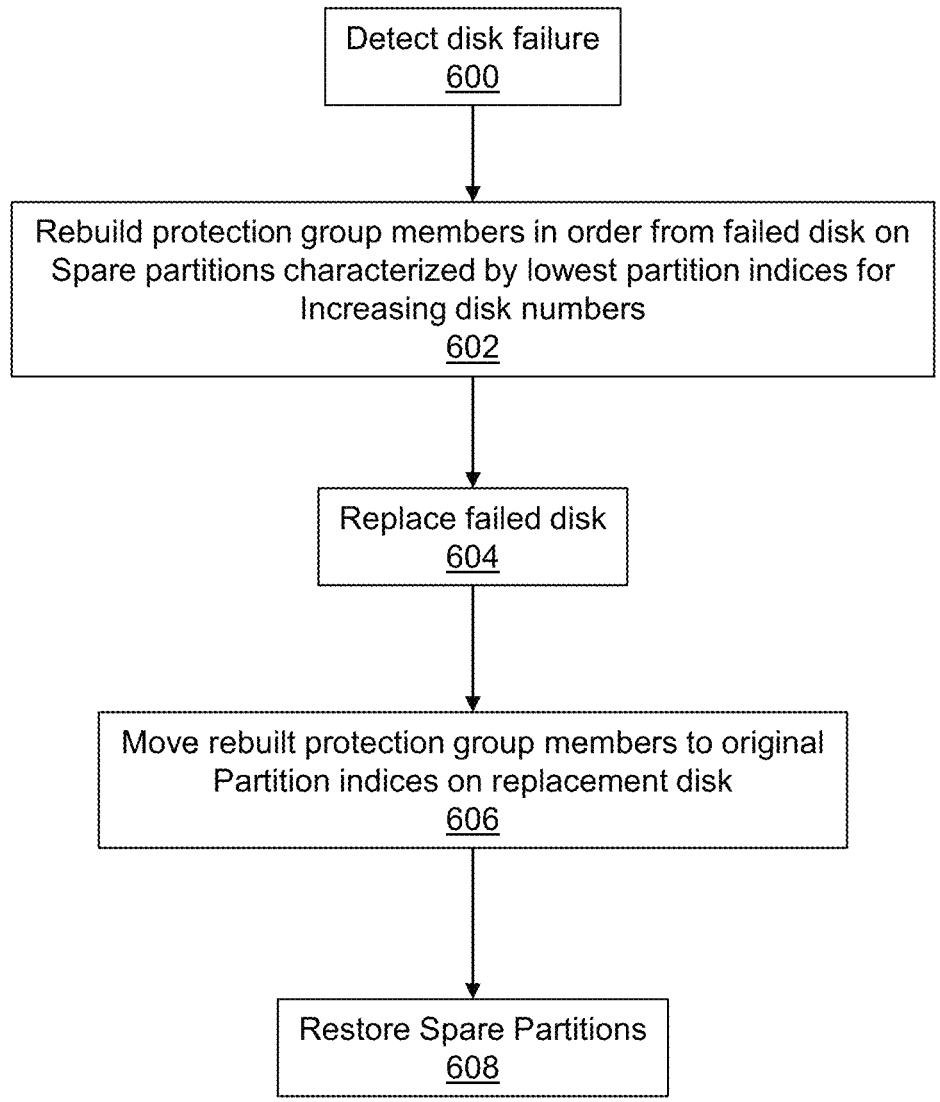
FIG. 6 illustrates a method for selection of parallel spare partitions for rebuild following a drive failure.

FIG. 6 illustrates a method for selection of parallel spare partitions for rebuild following a drive failure. Step 600 is detecting a drive failure. Step 602 is selecting and rebuilding protection group members of the failed drive, in order, on spare partitions characterized by lowest partition indices for increasing drive numbers. The protection group members of the failed drive may be sorted in order from lowest to greatest partition index. Spares in which those sorted protection group members are rebuilt are chosen in order by selecting the lowest partition index on which a spare is located for increasing drive numbers. Once all of the spares on the lowest partition index have been selected, the partition index is incremented, and spares partitions are selected in increasing drive order. The process is iterated until spare partitions have been selected for all the protection group members of the failed drive. The protection group members of the failed drive may be rebuilt in order of increasing partition indices on the selected spare partitions in diagonal/cluster size order from lowest partition index to highest partition index. After the failed drive is replaced, as indicated in step 606, the rebuilt protection group members are relocated from the spare partitions to the original partition indices of the replacement drive as indicated in step 606. In other words, the original protection group member/drive/partition relationships are restored. The spare partitions are then restored to available status and become ready for the next drive failure as indicated in step 608.

Specific examples have been presented to provide context and convey inventive concepts. The specific examples are not to be considered as limiting. A wide variety of modifications may be made without departing from the scope of the inventive concepts described herein. Moreover, the features, aspects, and implementations described herein may be combined in any technically possible way. Accordingly, modifications and combinations are within the scope of the following claims.

What is claimed is:

1. An apparatus, comprising:
    a storage array comprising:
        at least one compute node comprising at least one processor and non-transitory computer-readable memory;
        a plurality of non-volatile drives of different sizes in a fixed arithmetic relationship relative to a baseline drive size, the drives organized into a plurality of clusters based on storage capacity such that all the drives within each cluster have equal storage capacity; and
        a drive manager configured to:
            create M*G same-size partitions on the drives, where M is a positive integer defined by the fixed arithmetic relationship relative to the baseline drive size, and G is a redundant array of independent disks (RAID) group size such that storage capacity of all drives defines matrices of G+1 rows and M*G columns, and each matrix comprises submatrices of G+1 rows and G columns;
            allocate single diagonal spare partitions over groups of G columns of all the clusters;
            vertically distribute members of RAID groups such that members of a given RAID group reside in a single partition index of a single cluster of the plurality of clusters; and
            responsive to a drive failure in a first one of the plurality of clusters, select spare partitions from multiple other ones of the plurality of clusters and rebuild RAID group members of the failed drive on the selected spare partitions.

2. The apparatus of claim 1 wherein the drive manager is configured to allocate single diagonal spare partitions over all groups of G columns of all matrices.

3. The apparatus of claim 2 wherein the drive manager is configured to repurpose allocated diagonal spare partitions in excess of a target number of spare partitions for storage of RAID group members.

4. The apparatus of claim 1 wherein the drive manager is configured to select spare partitions from all clusters in order based on lowest partition index such that at least some of the RAID protection group members are rebuilt at different partition indices from partition indices at which those RAID protection group members were located on the failed drive.

5. The apparatus of claim 4 wherein the drive manager is configured to relocate rebuilt RAID group members from the selected spare partitions to a replacement drive.

6. The apparatus of claim 5 wherein the drive manager is configured to restore the selected spare partitions to available status.

7. A method implemented by a storage array comprising at least one compute node comprising at least one processor and non-transitory computer-readable memory, and a plurality of non-volatile drives of different sizes in a fixed arithmetic relationship relative to a baseline drive size, the method comprising:
    organizing the drives into a plurality of clusters based on storage capacity such that all the drives within each cluster have equal storage capacity;
    creating M*G same-size partitions on the drives, where M is a positive integer defined by the fixed arithmetic relationship relative to the baseline drive size, and G is a redundant array of independent disks (RAID) group size such that storage capacity of all drives defines matrices of G+1 rows and M*G columns, and each matrix comprises submatrices of G+1 rows and G columns;
    allocating single diagonal spare partitions over groups of G columns of all the clusters;
    vertically distributing members of RAID groups such that members of a given RAID group reside in a single partition index of a single cluster of the plurality of clusters; and
    responsive to a drive failure in a first one of the plurality of clusters, selecting spare partitions from multiple other ones of the plurality of clusters and rebuilding RAID group members of the failed drive on the selected spare partitions.

8. The method of claim 7 comprising allocating single diagonal spare partitions over all groups of G columns of all matrices.

9. The method of claim 8 comprising repurposing allocated diagonal spare partitions in excess of a target number of spare partitions for storage of RAID group members.

10. The method of claim 7 comprising selecting spare partitions from all clusters in order based on lowest partition index such that at least some of the RAID protection group members are rebuilt at different partition indices from partition indices at which those RAID protection group members were located on the failed drive.

11. The method of claim 10 comprising relocating rebuilt RAID group members from the selected spare partitions to a replacement drive.

12. The method of claim 11 comprising restoring the selected spare partitions to available status.

13. A non-transitory computer-readable storage medium with instructions that when executed by a storage array comprising at least one compute node comprising at least one processor and non-transitory computer-readable memory, and a plurality of non-volatile drives of different sizes in a fixed arithmetic relationship relative to a baseline drive size, cause the storage array to create distributed spare capacity, the method comprising:

organizing the drives into a plurality of clusters based on storage capacity such that all the drives within each cluster have equal storage capacity;

creating M*G same-size partitions on the drives, where M is a positive integer defined by the fixed arithmetic relationship relative to the baseline drive size, and G is a redundant array of independent disks (RAID) group size such that storage capacity of all drives defines matrices of G+1 rows and M*G columns, and each matrix comprises submatrices of G+1 rows and G columns;

allocating single diagonal spare partitions over groups of G columns of all the clusters;

vertically distributing members of RAID groups such that members of a given RAID group reside in a single partition index of a single cluster of the plurality of clusters; and responsive to a drive failure in a first one of the plurality of clusters, selecting spare partitions from multiple other ones of the plurality of clusters and rebuilding RAID group members of the failed drive on the selected spare partitions.

14. The non-transitory computer-readable storage medium of claim 13 wherein the method comprises allocating single diagonal spare partitions over all groups of G columns of all matrices.

15. The non-transitory computer-readable storage medium of claim 14 wherein the method comprises repurposing allocated diagonal spare partitions in excess of a target number of spare partitions for storage of RAID group members.

16. The non-transitory computer-readable storage medium of claim 13 wherein the method comprises selecting spare partitions from all clusters in order based on lowest partition index such that at least some of the RAID protection group members are rebuilt at different partition indices from partition indices at which those RAID protection group members were located on the failed drive.

17. The non-transitory computer-readable storage medium of claim 16 wherein the method comprises relocating rebuilt RAID group members from the selected spare partitions to a replacement drive.

\* \* \* \* \*